(12) United States Patent
Dohrmann et al.

(10) Patent No.: US 6,443,369 B1
(45) Date of Patent: Sep. 3, 2002

(54) FORAGE PRESERVATIVE APPLICATOR SYSTEM

(76) Inventors: Roger W. Dohrmann, 9647 Ironwood Dr., St. Joseph, MN (US) 56374; Dan R. Dohrmann, 8135 Old Highway Rd., St. Cloud, MN (US) 56301

( * ) Notice: Subject to any disclaimer, the term of this patent is extended or adjusted under 35 U.S.C. 154(b) by 0 days.

(21) Appl. No.: 09/724,886

(22) Filed: Nov. 28, 2000

(51) Int. Cl.[7] .................... A62C 11/00; B05B 7/26; B05B 7/30
(52) U.S. Cl. ............... 239/329; 239/317; 239/319
(58) Field of Search .................. 239/329, 104, 239/106, 172, 722, 723, 727, 128, 149, 112, 93, 95, 317, 319, 349

(56) References Cited

U.S. PATENT DOCUMENTS

| | | | | |
|---|---|---|---|---|
| 3,703,088 A | * | 11/1972 | Moorhead | 62/430 |
| 4,314,450 A | * | 2/1982 | Pelloux-Gervais | 62/45 |
| 4,818,546 A | * | 4/1989 | Whitford | 426/231 |
| 5,012,974 A | * | 5/1991 | Johnson | 239/142 |
| 5,016,817 A | * | 5/1991 | Ghate et al. | 239/113 |
| 5,064,123 A | * | 11/1991 | Aiello et al. | 239/706 |
| 5,147,133 A | * | 9/1992 | White | 366/138 |
| 5,227,067 A | * | 7/1993 | Runyon | 210/606 |
| 5,314,619 A | * | 5/1994 | Runyon | 210/606 |
| 5,785,523 A | * | 7/1998 | Overmyer | 433/82 |
| 6,089,409 A | * | 7/2000 | Hart et al. | 222/146.5 |
| 6,148,536 A | * | 11/2000 | Iijima | 34/92 |

* cited by examiner

Primary Examiner—Lesley D. Morris
Assistant Examiner—Davis Hwu
(74) Attorney, Agent, or Firm—Michael S. Neustel

(57) ABSTRACT

A forage preservative applicator system for efficiently and accurately providing forage preservatives to forage during harvesting. The forage preservative applicator system includes a support base, a reservoir positionable upon the support base for storing a volume of biological solution, a valve fluidly connected to the reservoir, a pump fluidly connected to the valve, and a dispensing tube fluidly connected to the pump for dispensing the biological solution into the forage being harvested. A flush container is preferably attached to the reservoir and fluidly connected to the valve for allowing flushing of the dispensing tube. At least one ice pack is preferably utilized within the reservoir for maintaining the temperature of a biological solution at the desired temperature for extending the useful life of the biological solution.

20 Claims, 6 Drawing Sheets

FORAGE PRESERVATIVE APPLICATOR SYSTEM

BACKGROUND OF THE INVENTION

1. Field of the Invention

The present invention relates generally to forage applicator devices and more specifically it relates to a forage preservative applicator system for efficiently and accurately providing forage preservatives to forage during harvesting.

The way forage is harvested and stored determines how well the quality of the crop is preserved. Large quantities of water must be passively removed from cut forage during field-curing of hay. For each ton of 12 percent moisture hay produced, approximately 1.7 and 2.2 tons of water is removed from the fresh herbage of grasses and legumes, respectively.

Hay or silage preservatives will reduce storage losses from molds, bacteria, and fungi when the forage is put up at higher moisture contents. There are many types of hay preservatives with various effects. The various products can be grouped into the five following categories: organic chemicals, inorganic chemicals, biologicals, nutrients, and non-specified additive ingredients.

Biological preservatives are generally comprised of bacterial inoculants and enzymes. Biological preservatives are difficult to utilize and expensive. In addition, biological preservatives generally require significant amounts of water for application to a forage crop.

Bacterial inoculants such as lactobacilli and pediococcus have been proven to be safe and non-toxic while delivering improved dry matter retention, improved protein retention, stability and animal acceptance, while remaining cost-effective. Inoculation of forage material with desirable acid-producing bacteria helps to initiate a rapid fermentation and sustain a rapid fall in pH of silage. In hay it may reduce the harmful effects of mold and yeast. In crops that are wilted, and water-soluble carbohydrates are not a problem, research has shown that the use of lactic acid bacteria is a cost-effective means of improving fermentation. Lactic acid bacteria produce both acetate and lactate under low oxygen conditions, which inhibits yeast. The pH level drops quickly, viable counts of yeast and mold are reduced, and the resulting product is very stable.

Enzymes such as cellulose, amylose, and lactobacillus (non-viable) bacteria have also been proven to be safe and non-toxic while delivering improved dry matter retention, improved protein retention, stability and animal acceptance, while remaining cost-effective. These enzymes promote plant cell breakdown and render the cellulose and starch more accessible to desirable acid-producing bacteria.

2. Description of the Prior Art

Forage preservative applicators have been in use for years. Conventional preservative applicators are comprised of a relatively large tank (25 to 100+ gallons), a pressure pump fluidly connected to the tank, pressure gauges and regulators fluidly connected to the pressure pump, and spray nozzles fluidly connected to the pressure pump for dispersing the preservative.

The main problem with conventional forage preservative applicators is that they have many mechanical components that are prone to failure and that are difficult for operators to utilize. In addition, unused preservative remaining within the tank is generally lost since there is no feasible means of maintaining the preservative. Conventional forage preservative applicators can cost a farmer significant amounts of money due to inefficiencies and lost preservative. Another problem with convention preservative applicators is that the reservoirs often times exceed 50 gallons which creates increased pressure upon the cellular structure of the bacteria which can damage or kill the bacteria.

While these devices may be suitable for the particular purpose to which they address, they are not as suitable for efficiently and accurately providing forage preservatives to forage during harvesting. Conventional forage preservative applicator systems are inefficient and difficult to utilize.

In these respects, the forage preservative applicator system according to the present invention substantially departs from the conventional concepts and designs of the prior art, and in so doing provides an apparatus primarily developed for the purpose of efficiently and accurately providing forage preservatives to forage during harvesting.

SUMMARY OF THE INVENTION

In view of the foregoing disadvantages inherent in the known types of forage additive devices now present in the prior art, the present invention provides a new forage preservative applicator system construction wherein the same can be utilized for efficiently and accurately providing forage preservatives to forage during harvesting.

The general purpose of the present invention, which will be described subsequently in greater detail, is to provide a new forage preservative applicator system that has many of the advantages of the forage additive devices mentioned heretofore and many novel features that result in a new forage preservative applicator system which is not anticipated, rendered obvious, suggested, or even implied by any of the prior art forage additive devices, either alone or in any combination thereof.

To attain this, the present invention generally comprises a support base, a reservoir positionable upon the support base for storing a volume of biological solution, a valve fluidly connected to the reservoir, a pump fluidly connected to the valve, and a dispensing tube fluidly connected to the pump for dispensing the biological solution into the forage being harvested. A flush container is preferably attached to the reservoir and fluidly connected to the valve for allowing flushing of the dispensing tube. At least one ice pack is preferably utilized within the reservoir for maintaining the temperature of a biological solution at the desired temperature for extending the useful life of the biological solution.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a forage preservative applicator system that will overcome the shortcomings of the prior art devices.

A second object is to provide a forage preservative applicator system for efficiently and accurately providing forage preservatives to forage during harvesting.

Another object is to provide a forage preservative applicator system that is constructed of a simple design and structure.

An additional object is to provide a forage preservative applicator system that is simple to utilize and operate for most individuals.

A further object is to provide a forage preservative applicator system that reduces the amount of forage preservative that is wasted.

Another object is to provide a forage preservative applicator system that reduces the costs of applying forage preservatives to crops.

A further object is to provide a forage preservative applicator system that allows any unused biological solution to be refrigerated within a conventional refrigerator.

Another object is to provide a forage preservative applicator system that utilizes a peristaltic pump for dispensing a biological solution at low pressure and volume rates.

Another object is to provide a forage preservative applicator system that utilizes higher concentrates of biological solution thereby reducing the amount of dilution and volume of biological solution handled at one time.

A further object is to provide a forage preservative applicator system that maintains a relatively cool temperature within a reservoir storing the biological solution to extend the useful life the bacterial or enzyme solution.

Another object is to provide a forage preservative applicator system that allows complete flushing of the fluid lines to remove bio-film buildup within the lines which are damaging to living bacterial inoculants.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
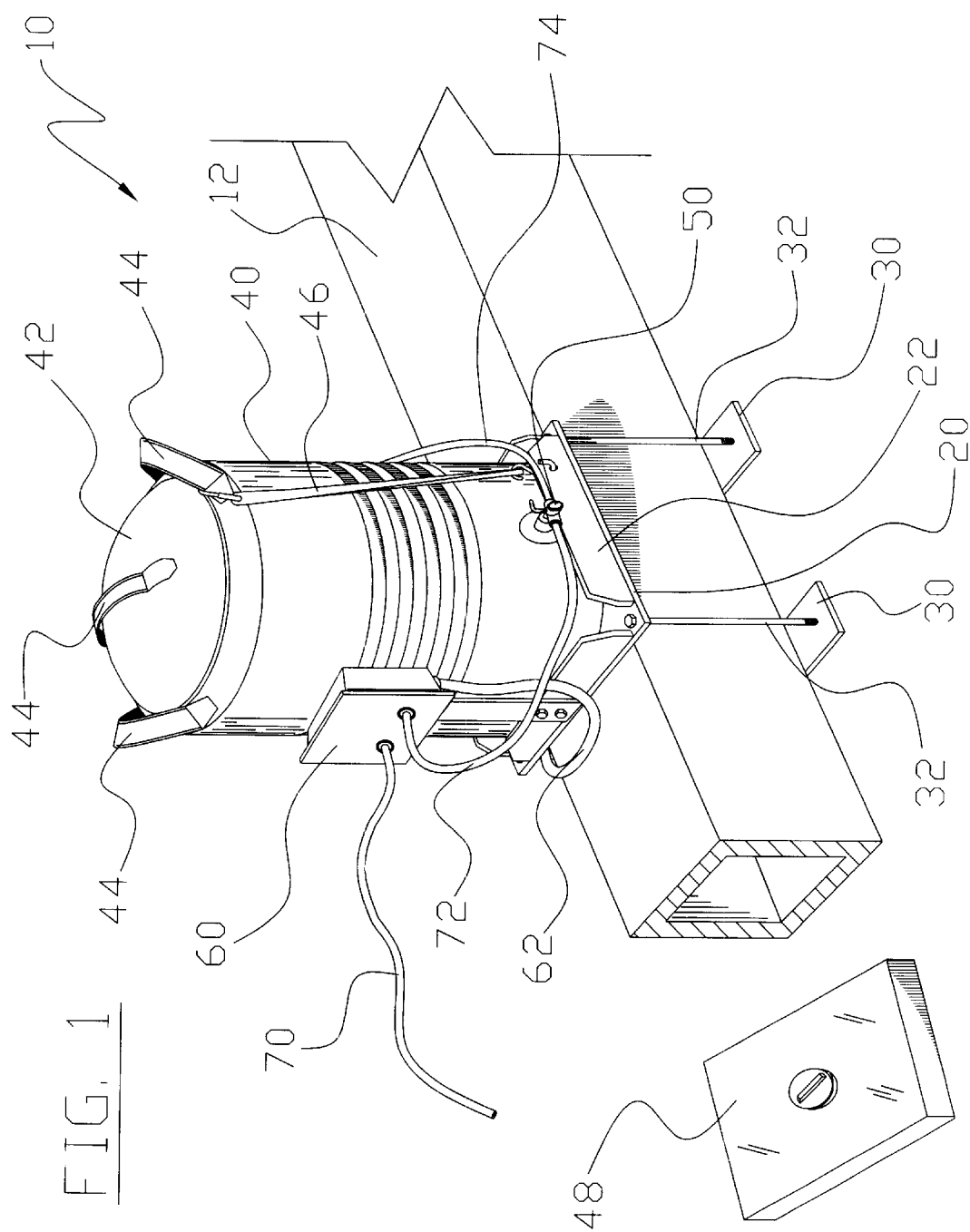
FIG. 1 is an upper perspective view of the present invention attached to an implement frame.

Turning now descriptively to the drawings, in which similar reference characters denote similar elements throughout the several views, FIGS. 1 through 6 illustrate a forage preservative applicator system 10, which comprises a support base 20, a reservoir 40 positionable upon the support base 20 for storing a volume of biological solution, a valve 50 fluidly connected to the reservoir 40, a pump 60 fluidly connected to the valve 50, and a dispensing tube 70 fluidly connected to the pump 60 for dispensing the biological solution into the forage being harvested. A flush container 80 is preferably attached to the reservoir 40 and fluidly connected to the valve 50 for allowing flushing of the dispensing tube 70. At least one ice pack 48 is preferably utilized within the reservoir 40 for maintaining the temperature of a biological solution at the desired temperature for extending the useful life of the biological solution.

As shown in FIGS. 1 through 5 of the drawings, a support base 20 is provided for supporting the reservoir 40 upon an implement frame 12 such as but not limited to a corn chopper or hay grinder. The support base 20 may be comprised of various shapes and structures designed to support and retain the reservoir 40 there upon. As further shown in FIGS. 1 through 5 of the drawings, a plurality of side walls 22 preferably extend upwardly from the support base 20 adjacent the outer perimeter thereof for retaining the reservoir 40 within the desired position.

As shown in FIG. 1 of the drawings, a plurality of brackets 30 are positionable about the implement frame 12 for securing the support base 20 to the implement frame 12. A plurality of rod members 32 are attached to the support base 20 and to the brackets 30 for securing the support base 20 about the implement frame 12. It can be appreciated that the support base 20 may be directly attached to the implement frame 12 or other structure utilizing various well-known attachment means.

As shown in FIGS. 1 through 5 of the drawings, the reservoir 40 is formed to retain a volume of concentrated biological solution or other solution such as but not limited to five or ten gallons. The reservoir 40 may have various shapes and sizes as can be appreciated. The reservoir 40 has an upper opening that is selectively enclosed by a cover 42. A plurality of handles 44 are preferably attached to the reservoir 40 and the cover 42 as shown in FIGS. 1 through 5 of the drawings. The handles 44 allow an individual to grasp and remove the reservoir 40 from the support base 20.

At least one securing strap 46 is preferably utilized to removably secure the reservoir 40 upon the support base 20 as shown in FIGS. 1 through 4 of the drawings. The securing strap 46 may be attached to one of the handles 44 as further shown in FIGS. 1 through 4. Various other attachment mechanisms may be utilized to removably attach the reservoir 40 upon the support base 20 as can be appreciated by one skilled in the art.

The reservoir 40 is preferably constructed with at least one layer of insulation to retain a relatively cool temperature within the interior portion of the reservoir 40. Various types of insulation may be utilized that a commonly utilized within conventional coolers and similar structures. The reservoir 40 may be constructed of various types of materials such as but not limited to metal or plastic.

At least one conventional ice pack 48 is preferably utilized within the interior portion of the reservoir 40 to assist in maintaining the desired cool temperature within the reservoir 40. The ice pack 48 may be constructed of any well-known structure, however is preferably filled with water to avoid contamination of the biological solution if the ice pack 48 should accidentally become punctured or ruptured. Various other cooling systems may be utilized within the reservoir 40 to assist in maintaining the relatively cool temperature of the biological solution contained within the reservoir 40.

Figure 2:
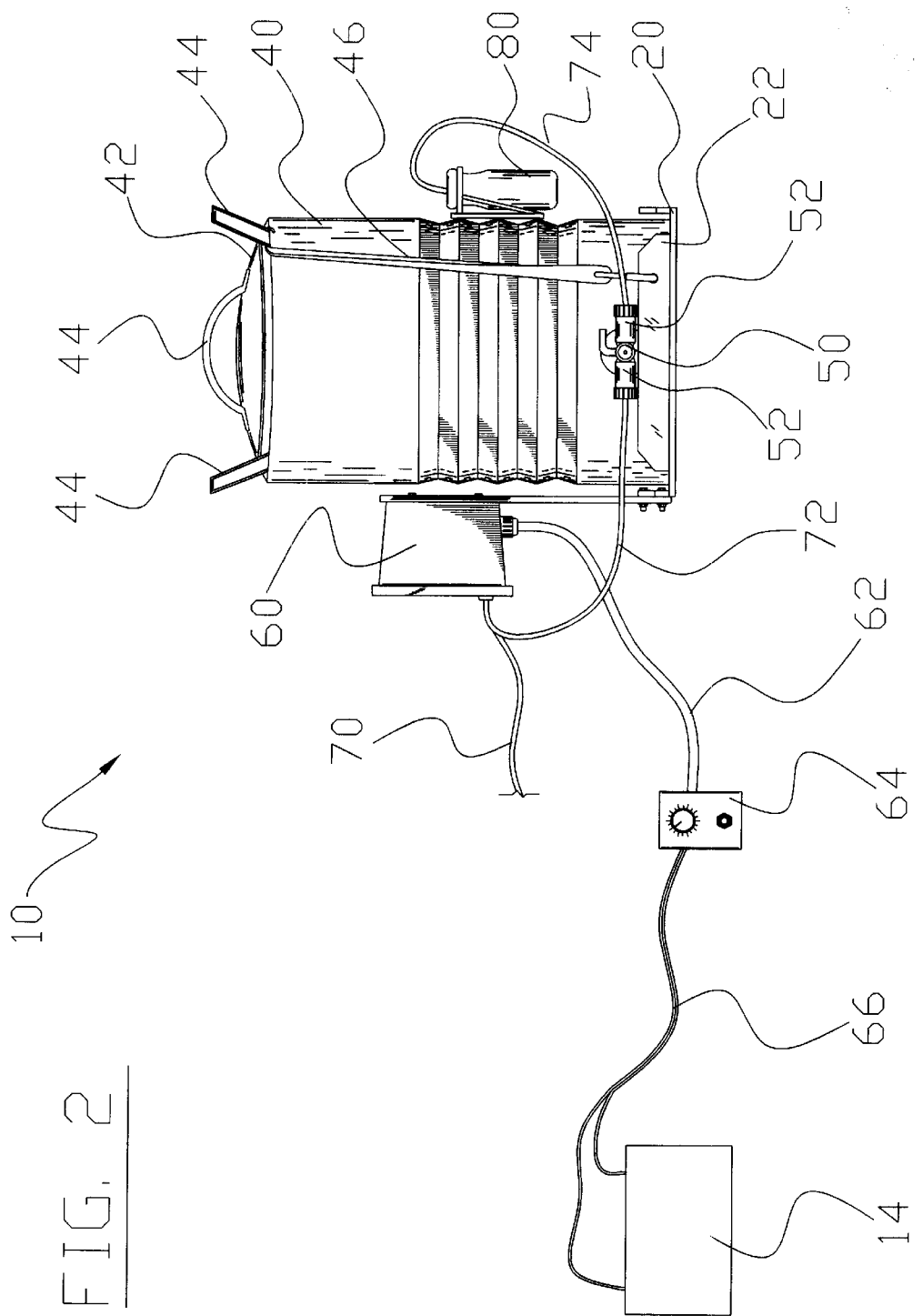
FIG. 2 is a side view of the present invention.

As best shown in FIGS. 1 and 2 of the drawings, a valve 50 is fluidly connected to the reservoir 40 for receiving the biological solution contained within. The valve 50 is preferably a three-way valve 50 to allow closing of fluid flow through the dispensing tube 70, directing fluid flow from the reservoir 40 to the dispensing tube 70, or directing fluid flow from the flush container 80 to the dispensing tube 70. A two-way valve 50 may also be utilized particularly if the flush container 80 is not fluidly connected to the valve 50. A pair of couplers 52 are attached to the valve 50 for allowing quick attachment and release of the dispensing tube 70 and the flush tube 74 to allow the reservoir 40 to be removed from the support base 20.

As shown in FIGS. 1 through 5 of the drawings, a pump 60 is attached to the support base 20 with a bracket structure. The pump 60 is comprised of a low volume/low pressure pump 60 to dispense low volume rates of biological solution from the reservoir 40 through the dispensing tube 70. The pump 60 is preferably comprised of a peristaltic pump 60 structure that are commonly utilized in other industries to provide accurate low level flow rates such as .5 ounces to 8 ounces per minute.

Figure 3:
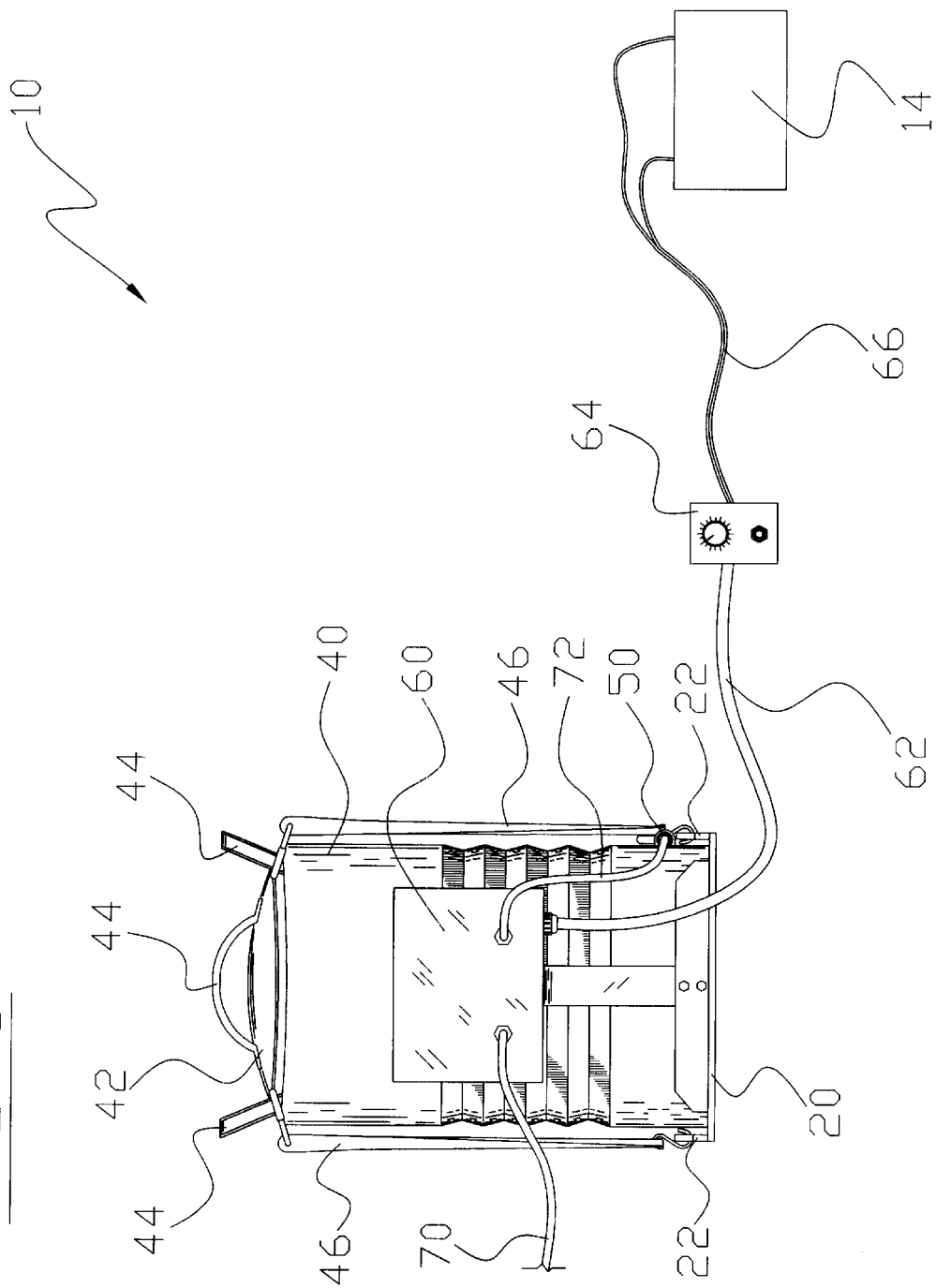
FIG. 3 is a front view of the present invention.
Figure 4:
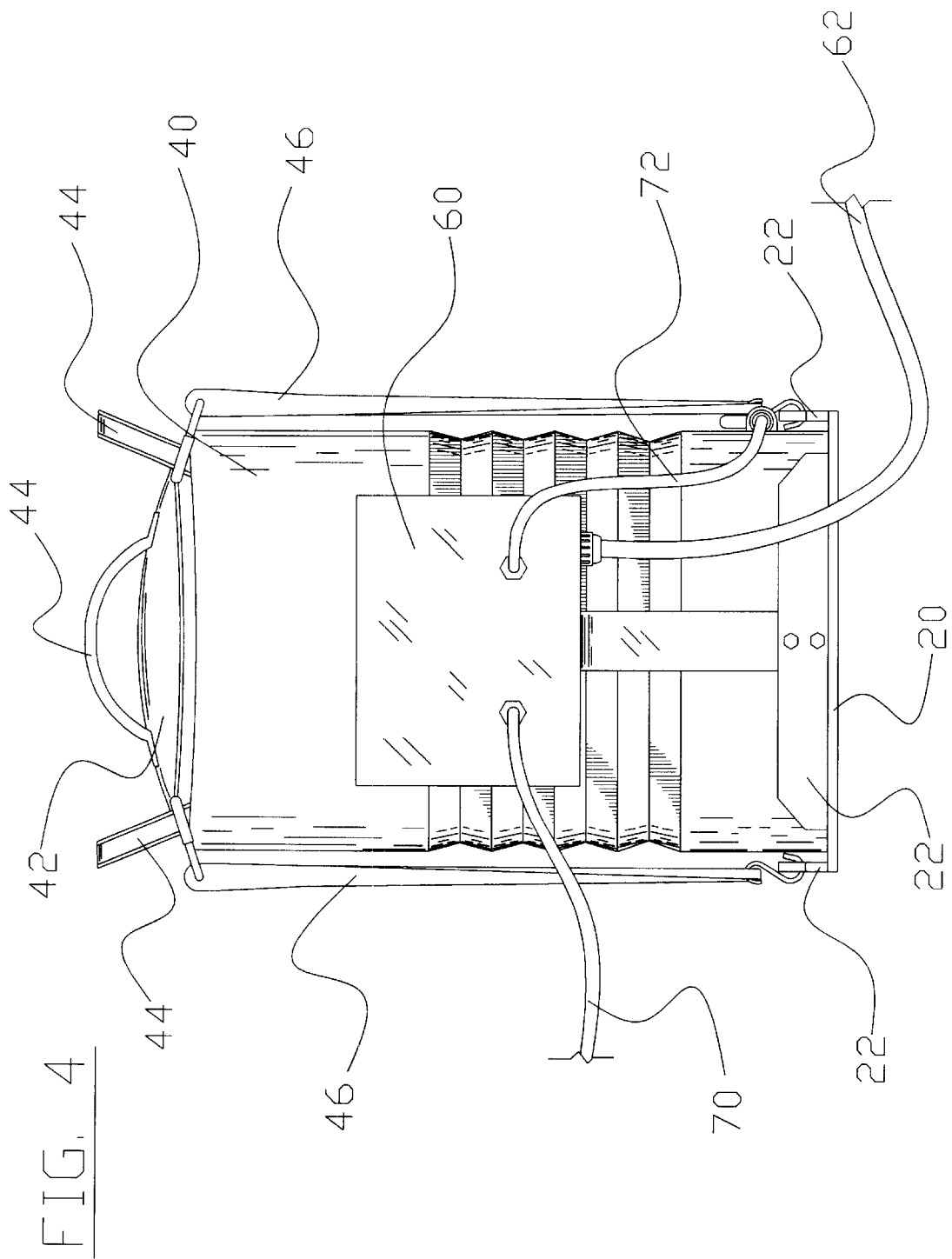
FIG. 4 is a magnified front view of the reservoir.
Figure 6:
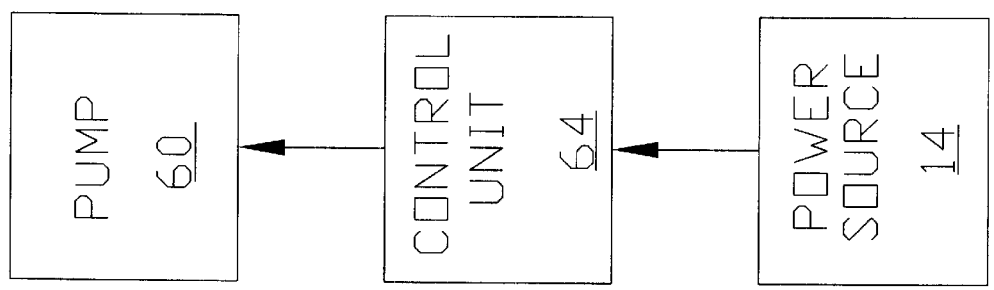
FIG. 6 is a block diagram of the electrical components of the present invention.

The pump 60 preferably is adjustable for allowing various flow rates to be achieved. The pump 60 is controlled by a control unit 64 in communication with the pump 60 via a control cable 62 as shown in FIGS. 2, 3 and 6 of the drawings. The control unit 64 is comprised of at least a power switch and a control knob for allowing the adjustment of the flow rate of the biological solution depending upon the rate of forage being treated. The control unit 64 is connected to a power source 14 such as a battery upon a tractor via a power cable 66 for providing electrical power to the control unit 64 and the pump 60.

The pump 60 is fluidly connected to the valve 50 via an input tube 72 as shown in FIGS. 1 through 3 of the drawings. The dispensing tube 70 is fluidly connected to the pump 60 for receiving the exiting biological solution dispersed from the pump 60. The distal end of the dispensing tube 70 is preferably positioned adjacent the cutting portion of an implement such as are commonly utilized with a corn chopper to distribute the biological solution. The biological solution is thereafter dispersed directly onto the forage or upon the cutting blades of the agricultural implement to be mixed in with the forage during processing at the appropriate rate.

Figure 5:
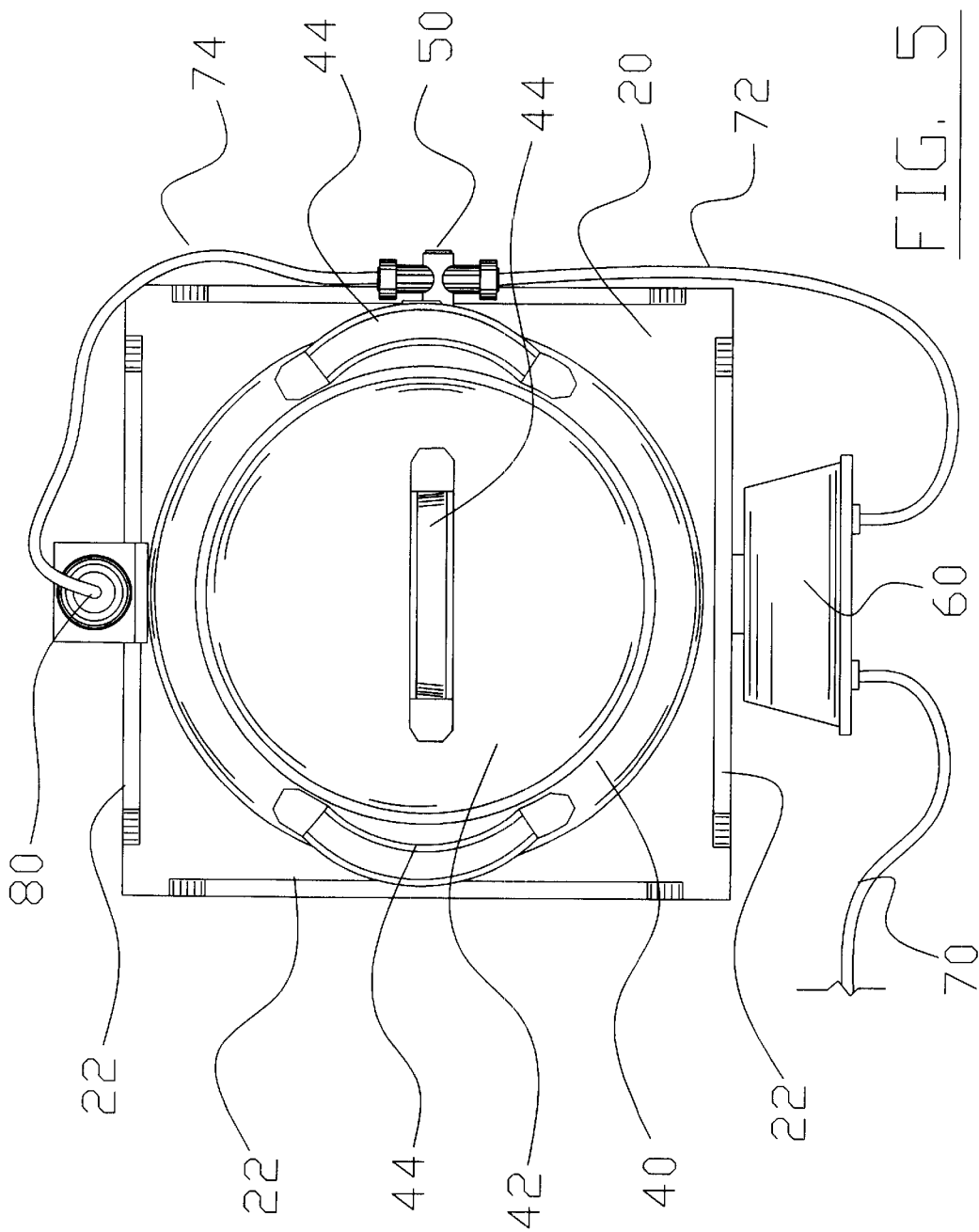
FIG. 5 is a top view of the present invention.

As shown in FIGS. 2 and 5 of the drawings, a flush container 80 is attached to the side of the reservoir 40 at an elevated height. The flush container 80 is fluidly connected to the valve 50 via flush tube 74 as further shown in FIGS. 2 and 5 of the drawings. The flush container 80 is capable of storing a volume of flushing fluid such as water or bleach for flushing the input tube 72, pump 60 and the dispensing tube 70 after usage thereof to reduce the buildup of bio-film from dead cells.

In use, the user fills the reservoir 40 with the desired solution such as bacterial inoculants or enzymes. The user may dilute the solution with water or other fluid if desired to achieve the desired rates of application. The user then may insert at least one ice pack 48 into the interior of the reservoir 40 within the solution to help retain the temperature of the solution at a relatively cool temperature relative to outside of the reservoir 40 thereby extending the useful life of the bacteria and enzymes. The user adjusts the valve 50 so that fluid flow from the reservoir 40 into the input tube 72 is allowed. When the implement is in operation, the user adjusts the rate settings of the control unit 64 that control the output of the pump 60. The user then closes the power switch of the control unit 64 to activate the pump 60 which draws the solution from within the reservoir 40 through the valve 50 and into the input tube 72. The pump 60 then dispenses the solution through the dispensing tube 70 where the solution exits the distal end of the dispensing tube 70 onto the forage and cutting assembly of the implement thereby thoroughly mixing the solution in with the forage being chopped. If increased rates of forage is run through the implement then the control unit 64 is adjusted accordingly so that the pump 60 outputs an increased rate of the solution. If decreased rates of forage is run through the implement then the control unit 64 is adjusted accordingly so that the pump 60 outputs a decreased rate of the solution. Because the reservoir 40 is insulated, the temperature within the reservoir 40 and the solution is retained at a relatively low temperature to extend the useful life of the biological solution contained within. When the user is finished operating the implement for the day, the user then switches the valve 50 so that fluid from the flush container 80 may enter the input tube 72, the pump 60 and the dispensing tube 70. The flush container 80 may contain water, bleach or other cleaning solution to clean the input tube 72, the pump 60 and the dispensing tube 70 to prevent the buildup of bio-film. After flushing the system, the user then closes the valve 50 and removes the input tube 72 from the valve 50 by removing the coupler 52 associated with the input tube 72. The user then removes the securing strap 46 thereby allowing removal of the reservoir 40. The reservoir 40 may then be placed within a cool structure such as a refrigerator. Another ice pack 48 may also be added to the solution within the reservoir 40 to assist in maintaining the desired cool temperature of the solution within the reservoir 40. The user simply reconnects the removed components when desired to operate the implement again and repeats the above steps.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A forage preservative applicator system for delivering a biological preservative solution within a crop harvester upon forage prior to processing within said crop harvester, comprising:

a support base attachable to an implement frame;

a reservoir having a removable cover removably positionable upon said support base, wherein said reservoir is capable of storing a volume of said biological preservative solution;

a valve fluidly connected to said reservoir;

a pump fluidly connected to said valve, wherein said pump is capable of transferring said biological preservative solution at a low volume rate; and a dispensing tube fluidly connected to said pump for dispensing said biological preservative solution, wherein a distal end of said dispensing tube is positioned at a central point within a header of said crop harvester that combines said crop so that said biological preservative solution is dispensed upon said forage prior to processing.

2. The forage preservative applicator system of claim 1, wherein said reservoir is insulated.

3. The forage preservative applicator system of claim 1, wherein said reservoir includes at least one handle.

4. The forage preservative applicator system of claim 1, including a means for removably securing said reservoir to said support base.

5. The forage preservative applicator system of claim 1, including a control unit electrically connected to said pump.

6. The forage preservative applicator system of claim 1, wherein said pump is comprised of a peristaltic pump.

7. The forage preservative applicator system of claim 1, including at least one ice pack positioned within said reservoir.

8. The forage preservative applicator system of claim 1, wherein said pump is capable of transferring said biological preservative solution at a rate between 0.5 ounces to 8 ounces per minute.

9. The forage preservative applicator system of claim 8, wherein said pump is comprised of a peristaltic pump.

10. The forage preservative applicator system of claim 9, including at least one ice pack.

11. A forage preservative applicator system for delivering a biological preservative solution within a crop harvester upon forage prior to processing within said crop harvester, comprising:

a support base attachable to an implement frame, a reservoir having a removable cover removably positionable upon said support base, wherein said reservoir is capable of storing a volume of said biological preservative solution;

a valve fluidly connected to said reservoir;

a pump fluidly connected to said valve, wherein said pump is capable of transferring said biological preservative solution at a low volume rate;

a flush container attached to said reservoir, wherein said flush container stores a flushing solution; and a dispensing tube fluidly connected to said pump for dispensing said biological preservative solution, wherein a distal end of said dispensing tube is positioned at a central point within a header of said crop harvester that combines said crop so that said biological preservative solution is dispensed upon forage prior to processing.

12. The forage preservative applicator system of claim 11, wherein said reservoir is insulated.

13. The forage preservative applicator system of claim 11, wherein said reservoir includes at least one handle.

14. The forage preservative applicator system of claim 11, including a means for removably securing said reservoir to said support base.

15. The forage preservative applicator system of claim 11, including a control unit electrically connected to said pump.

16. The forage preservative applicator system of claim 11, wherein said pump is comprised of a peristaltic pump.

17. The forage preservative applicator system of claim 11, including at least one ice pack positioned within said reservoir.

18. The forage preservative applicator system of claim 11, wherein said pump is capable of transferring said biological preservative solution at a rate between 0.5 ounces to 8 ounces per minute.

19. The forage preservative applicator system of claim 11, wherein said flush solution includes at least one part bleach.

20. A method of utilizing an applicator for delivering a biological preservative solution upon forage prior to processing within a crop harvester, said applicator comprising a support base attachable to an implement frame, a reservoir having a removable cover removably positionable upon said support base, wherein said reservoir is capable of storing a volume of said biological preservative solution, a valve fluidly connected to said reservoir, a pump fluidly connected to said valve, wherein said pump is capable of transferring said biological preservative solution at a low volume rate, a flush container attached to said reservoir, wherein said flush container stores a flushing solution, and a dispensing tube fluidly connected to said pump for dispensing said biological preservative solution, wherein a distal end of said dispensing tube is positioned at a central point within a header of said crop harvester that combines said crop so that said biological preservative solution is dispensed upon forage prior to processing, said method comprising the steps of:

(a) providing said volume of biological preservative solution within said reservoir;

(b) operating said crop harvester to harvest a crop;

(c) operating said pump for distributing a flow of said biological preservative solution upon said crop severed by said crop harvester prior to processing within said crop harvester; and (d) continuing step (c) until said crop harvester has finished harvesting said crop.

* * * * *